(12) United States Patent
Geis-Esser (10) Patent No.: US 12,012,004 B2
(45) Date of Patent: Jun. 18, 2024

(54) DRIVE TRAIN FOR A VEHICLE

(71) Applicant: KNORR-BREMSE Systeme fuer Nutzfahrzeuge GmbH, Munich (DE)

(72) Inventor: Daniel Geis-Esser, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/639,214

(22) PCT Filed: Jul. 28, 2020

(86) PCT No.: PCT/EP2020/071288
§ 371 (c)(1),
(2) Date: Feb. 28, 2022

(87) PCT Pub. No.: WO2021/037464
PCT Pub. Date: Mar. 4, 2021

(65) Prior Publication Data
US 2022/0324318 A1 Oct. 13, 2022

(30) Foreign Application Priority Data
Aug. 30, 2019 (DE) .................... 10 2019 123 367.4

(51) Int. Cl.
*F16H 3/72* (2006.01)
*B60K 6/365* (2007.10)
(Continued)

(52) U.S. Cl.
CPC ............. *B60K 6/547* (2013.01); *B60K 6/365* (2013.01); *B60K 6/48* (2013.01); *F16H 3/72* (2013.01);
(Continued)

(58) Field of Classification Search
CPC ........ F16H 3/72; F16H 3/727; F16H 37/0813; F16H 37/0826; F16H 2048/362;
(Continued)

(56) References Cited

U.S. PATENT DOCUMENTS 3,566,717 A * 3/1971 Berman et al. ............ B60L 3/06
903/910
4,252,208 A * 2/1981 Heidemeyer ............ F16D 47/00
192/48.8

(Continued)

FOREIGN PATENT DOCUMENTS

| CN | 102307744 A | 1/2012 |
|---|---|---|
| CN | 103987987 A | 8/2014 |

(Continued)

OTHER PUBLICATIONS

International Search Report (PCT/ISA/210) issued in PCT Application No. PCT/EP2020/071288 dated Oct. 29, 2020 with English translation (four (4) pages).

(Continued)

*Primary Examiner* — Roger L Pang
(74) *Attorney, Agent, or Firm* — Crowell & Moring LLP (57) ABSTRACT

A drive train for a vehicle includes at least one transmission having a primary input shaft designed to be connected to a primary drive, a secondary input shaft designed to be connected to a secondary drive, an output shaft designed to output power that has been introduced into the at least one transmission by the primary input shaft, and a planetary gearbox designed to continuously variably set a transmission ratio between the primary input shaft and the output shaft on the basis of the rotational speed of the secondary input shaft. The invention further relates to a vehicle having a drive train of this type, to a method for controlling a drive train of this type, and to a computer program product.

17 Claims, 4 Drawing Sheets

(51) Int. Cl.
   *B60K 6/48*     (2007.10)
   *B60K 6/547*    (2007.10)
   *F16H 37/08*    (2006.01)
   *F16H 48/36*    (2012.01)

(52) U.S. Cl.
   CPC .. *F16H 37/0813* (2013.01); *B60K 2006/4833* (2013.01); *F16H 2048/362* (2013.01)

(58) Field of Classification Search
   CPC ......... F16H 2200/0021; F16H 204/362; B60K 6/547; B60K 6/365; B60K 6/48; B60K 2006/4833; B60K 1/02
   USPC ...................................... 475/5, 150
   See application file for complete search history.

(56) References Cited

U.S. PATENT DOCUMENTS

| | | | | |
|---|---|---|---|---|
| 4,411,171 A | * | 10/1983 | Fiala | B60K 6/30 |
| | | | | 903/910 |
| 4,973,295 A | * | 11/1990 | Lee | F16H 3/72 |
| | | | | 475/329 |
| 2004/0097316 A1 | * | 5/2004 | Misu | B60W 10/08 |
| | | | | 903/910 |
| 2005/0119083 A1 | | 6/2005 | Lu et al. | |
| 2005/0133286 A1 | | 6/2005 | Oshidari | |
| 2009/0076694 A1 | | 3/2009 | Tabata et al. | |
| 2009/0194347 A1 | | 8/2009 | Morrow et al. | |
| 2012/0157255 A1 | | 6/2012 | Trindade | |
| 2013/0046427 A1 | * | 2/2013 | Hohenberg | B60K 6/365 |
| | | | | 180/65.265 |
| 2014/0278041 A1 | | 9/2014 | Brenninger | |
| 2016/0265631 A1 | | 9/2016 | Strashny et al. | |
| 2016/0333985 A1 | | 11/2016 | Ziemer et al. | |
| 2017/0166194 A1 | * | 6/2017 | Kumazaki | B60W 20/14 |
| 2017/0361696 A1 | * | 12/2017 | Davydov | B60W 10/08 |
| 2018/0320783 A1 | * | 11/2018 | Lindström | B60W 30/18 |
| 2022/0032766 A1 | * | 2/2022 | Bayoux | B60K 6/547 |

FOREIGN PATENT DOCUMENTS

| | | |
|---|---|---|
| CN | 105228895 A | 1/2016 |
| CN | 106143108 A | 11/2016 |
| CN | 106560336 A | 4/2017 |
| DE | 60 2004 002 073 T2 | 1/2007 |
| DE | 11 2006 001 485 B4 | 4/2016 |
| EP | 1 426 222 B1 | 11/2005 |

OTHER PUBLICATIONS

German-language Written Opinion (PCT/ISA/237) issued in PCT Application No. PCT/EP2020/071288 dated Oct. 29, 2020 (five (5) pages).

German-language Office Action issued in German Application No. 10 2019 123 367.4 dated May 12, 2020 (10 pages).

International Preliminary Report on Patentability (PCT/IB/338 & PCT/IB/373) issued in PCT Application No. PCT/EP2020/071288 dated Oct. 29, 2020, including English translation of document C2 (German- language Written Opinion (PCT/ISA/237), filed on Feb. 28, 2022) (nine (9) pages).

Chinese-language Office Action issued in Chinese Application No. 202080060164.7 dated Apr. 15, 2023 with English translation (8 pages).

* cited by examiner

DRIVE TRAIN FOR A VEHICLE

BACKGROUND AND SUMMARY OF THE INVENTION

The present invention concerns a drive train for a vehicle, a vehicle with such a drive train, a method for controlling such a drive train, and a computer program product for executing such a method.

To change the translation ratio of vehicle transmissions during travel, selectable gear mechanisms are known. These usually have the disadvantageous property that the traction force is interrupted during a shift process, which is perceived as uncomfortable by vehicle occupants.

To counter this problem, transmissions were developed which either have no interruption in traction force or only a slight interruption in traction force during shift processes. These are in particular CVT transmissions, dual clutch transmissions and transmissions with hydrodynamic torque converters. These transmissions however again have disadvantages. In the case of CVT transmissions, the torque is transmitted by friction, for example between two opposing cones with transmission element arranged in between, or by means of conical discs which are in frictional contact with a chain. The transmissible power or transmissible torque is here greatly restricted because of the friction. A dual clutch transmission has a high structural complexity, and a transmission with a hydrodynamic torque converter entails high losses, which means that the torque converter is mainly used on pulling away.

The present invention is therefore based on the object of creating a possibility of implementing a drive train with steplessly adjustable translation ratio which solves the above-mentioned problems.

This object is achieved by the subjects of the independent claims. Advantageous refinements are the subject of the subclaims.

The text below refers at several points to intermediate elements which are provided in a connection of various elements of the drive train. These are in particular gear stages, gear mechanisms, differentials, torque converters or clutches. However, this list should not be regarded as conclusive. If further intermediate elements also appear useful to the person skilled in the art, these also correspond to the subject of the invention.

According to the invention, a drive train is provided for a vehicle, in particular a utility vehicle, having at least one transmission, wherein the at least one transmission comprises the following:
  a primary input shaft which is designed to be connected to a primary drive;
  a secondary input shaft which is designed to be connected to a secondary drive;
  an output shaft which is designed to output power which has been introduced into the at least one transmission by means of the primary input shaft; and
  a planetary gear train which is arranged between the primary input shaft and the output shaft and is designed to steplessly set a translation ratio between the primary input shaft and the output shaft on the basis of the rotation speed of the secondary input shaft.

The planetary gear train preferably comprises three shafts which in particular are preferably arranged coaxially to one another.

Preferably, the primary input shaft, the secondary input shaft and/or the output shaft are directly connected to one of the shafts of the planetary gear train. As an alternative to a direct connection, intermediate elements may be provided, in particular gear stages, gear mechanisms, torque converters or clutches.

The principle of steplessly adjusting of the translation ratio comprises predefining the rotation speed of the secondary input shaft. If simultaneously the rotation speed of the output shaft is predefined, for example by a current vehicle speed, the rotation speed of the primary input shaft is predefined. In a planetary gear mechanism with a sun gear, a carrier shaft and a ring gear which are connected directly or via intermediate elements to the primary input shaft, secondary input shaft and output shaft respectively, the rotation speeds may be calculated according to Willis' equation:

$$n_{Sun\ gear} - i_0 \times n_{Ring\ gear} - (1-i_0) \times n_{Carrier\ shaft} = 0$$

wherein $n_i$ stands for the individual rotation speeds, $i_0$ the set idling translation ratio of the planetary gear train, for which:

$$i_0 = n_{Sun\ gear}/n_{Ring\ gear},$$

wherein simultaneously the carrier shaft is held stationary and:

$$n_{Carrier\ shaft} = 0$$

The Willis equation thus provides a kinematic relationship between the three shafts of the planetary gear train. When two rotation speeds are defined, the third rotation speed is always established.

Preferably, an intermediate gear unit is arranged between the primary input shaft, the secondary input shaft and/or the output shaft on one side and the planetary gear train on the other. In this way for example, an over-large structure of a planetary gear train can be avoided. The intermediate gear unit may in particular be configured as a gear stage, wherein more complex gear units up to selectable gear mechanisms are possible. In particular, a selectable gear mechanism may be provided between the primary input shaft and the planetary gear train, and/or between the planetary gear train and the output shaft.

Preferably, the primary input shaft is connected directly or via intermediate elements to a sun gear of the planetary gear train. Alternatively or additionally, the secondary input shaft is connected directly or via intermediate elements to a carrier shaft of the planetary gear train. Alternatively or additionally, the output shaft is connected directly or via intermediate elements to a ring gear of the planetary gear train.

Alternatively however, other configurations are also possible. The primary input shaft may also be connected directly or via intermediate elements to a carrier shaft or a ring gear of the planetary gear train. The secondary input shaft may also be connected directly or via intermediate elements to a sun gear of the planetary gear train or to a ring gear of the planetary gear train. The output shaft may also be connected directly or via intermediate elements to a sun gear or a carrier shaft of the planetary gear train.

When the primary input shaft is connected to the sun gear, the secondary input shaft is connected to the carrier web, and the output shaft is connected to the ring gear of the planetary gear train, according to the invention a steplessly adjustable translation ratio is achieved between the primary input shaft and the output shaft by a stepless adjustment of the translation ratio between the sun gear and the ring gear of the planetary gear train, wherein the stepless adjustment takes place via the rotation speed of the secondary input shaft which acts on the carrier shaft.

Preferably, the at least one transmission has a path which leads from the primary input shaft exclusively via the planetary gear train to the output shaft. Alternatively or additionally, the at least one transmission has a further path which leads from the secondary input shaft exclusively via the planetary gear train to the output shaft. These particular configurations are distinguished by a small space requirement, in particular in an extent direction parallel to the axes of the primary input shaft, secondary input shaft and/or output shaft. In this way, advantageously, a compact transmission structure can be achieved.

Preferably, the drive train furthermore comprises a primary drive which is connected or designed to be connected to the primary input shaft of the at least one transmission. The connection takes place directly or via intermediate elements. Alternatively or additionally, the drive train comprises at least one secondary drive which is connected or designed to be connected to at least one secondary input shaft of the at least one transmission. The connection takes place directly or via intermediate elements.

Preferably, the output shaft of the at least one transmission is connected or designed to be connected directly or via intermediate elements, preferably via a differential, to at least one wheel of the vehicle. The output shaft thus in particular serves to conduct power to at least one wheel of the vehicle in order to drive the vehicle.

Preferably, the drive train comprises at least one second transmission as described above, wherein an output shaft of one of the at least two transmissions is connected to one or more wheels on one side of a longitudinal direction of the vehicle, and an output shaft of another of the at least two transmissions is connected to one or more wheels on the other side of a longitudinal direction of the vehicle. Thus advantageously, a possibility is created of conducting power, which is supplied via the output shafts of the transmissions, to wheels on both sides of a longitudinal direction of the vehicle, in order for example to be able to implement driving dynamic adjustments. Alternatively or additionally, an output shaft of one of the at least two transmissions may be connected to one or more wheels of an axle of the vehicle, and an output shaft of another of the at least two transmissions may be connected to one or more wheels of another axle of the vehicle. In this way, a drive of the vehicle with several driven axles, in particular an all-wheel drive, can be achieved. Preferably, the individual output shafts of the at least two transmissions are connected directly or via intermediate elements, preferably via a differential, to at least one wheel of the vehicle.

Preferably, the drive train is configured to set the translation ratio between the primary input shaft and the output shaft of the at least two transmissions, at least on each side of the longitudinal direction of the vehicle, preferably wheel-individually, via the rotation speed of the secondary input shafts of the at least two transmissions. With this configuration, in particular the possibility is created of implementing a differential function or also a differential lock in the case of a desired same rotation speed of the wheel-individual secondary drives.

Preferably, the drive train comprises at least one device for interrupting the connection between the planetary gear train and the primary input shaft of the at least one transmission. Alternatively or additionally, the drive train comprises at least one device for interrupting the connection between the planetary gear train and the secondary input shaft of the at least one transmission. Alternatively or additionally, the drive train comprises at least one device for interrupting the connection between the planetary gear train and the output shaft of the at least one transmission. Said devices are in particular clutches such as friction or plate clutches, but also form-fit clutches such as claw clutches.

Preferably, the drive train comprises at least one device for converting torque or rotation speed between the planetary gear train and the primary input shaft of the at least one transmission. Alternatively or additionally, the drive train comprises at least one device for converting torque or rotation speed between the planetary gear train and the secondary input shaft of the at least one transmission. Alternatively or additionally, the drive train comprises at least one device for converting torque or rotation speed between the planetary gear train and the output shaft of the at least one transmission. Said devices are in particular single-stage or multistage gear units, selectable gear mechanisms and/or torque converters.

The drive train is preferably configured to brake the secondary input shaft to a standstill in order to hold stationary the shaft of the planetary gear mechanism which is connected to the secondary input shaft. In particular, this is the carrier shaft, so that when the secondary input shaft is braked to a standstill, the planetary gear mechanism is operated with a set idling translation ratio. Braking to a standstill may itself be achieved in particular by a specific design of the secondary drive or by special devices such as brakes. The secondary drive may for example apply a counter-moment to the secondary input shaft, which is dimensioned such that the secondary input shaft does not execute any rotational movement.

Preferably, the primary drive comprises an internal combustion engine and/or an electric motor. The primary drive is in particular configured to provide the power necessary for driving the vehicle.

Alternatively or additionally, the secondary drive comprises an electric motor. The secondary drive is in particular configured to apply a required rotation speed to the secondary input shaft in order to set the desired translation ratio between the primary input shaft and the output shaft in the transmission of the drive train. The secondary drive, in particular the electric motor, preferably has a smaller maximum power than the primary drive. This is preferably less than 80%, particularly preferably less than 50%, and in particular less than 20% of the maximum power of the primary drive. Preferably, the secondary drive is configured solely to apply a rotation speed to the secondary input shaft, wherein no significant power is introduced to the transmission. Therefore the secondary drive may be designed smaller with respect to its maximum power than the primary drive. Not least, this leads to advantages in terms of installation space and costs.

The drive train preferably comprises a control means which is configured to control the drive train. Particularly preferably, the control means comprises a control unit. The control means is preferably configured to perform the method described below. In particular, the control means is configured to determine a required power which is to be applied to the primary input shaft via the primary drive, and/or a rotation speed which is to be applied to the secondary input shaft via the secondary drive, and in particular to actuate the primary drive and/or secondary drive accordingly. The control means is finally preferably configured, by means of a computer program product in particular as described below, to implement the method described below for controlling the drive train.

According to the invention, a vehicle is provided, in particular a utility vehicle, which has a drive train as described above, wherein the output shaft of the at least one transmission is connected to at least one wheel of the vehicle directly or via intermediate elements, preferably via a differential. In particular in the utility vehicle sector, for reasons of economics, it is desired that a drive machine is operated in the region most favorable for fuel consumption as often as possible. A utility vehicle which is driven by the drive train, in particular by the power of the primary drive, is thus held in this range by the steplessly adjustable translation ratio, wherein at the same time, in comparison with solutions from the prior art, higher torques or higher power levels can be conducted from the primary drive to the output shaft or to the wheels. The primary drive here preferably comprises an internal combustion engine, particularly preferably a diesel engine. However, also an electrically driven vehicle may be provided in which the primary drive comprises an electric motor. Furthermore, a hybrid vehicle is also conceivable in which the primary drive comprises both an internal combustion engine and an electric motor.

According to the invention, a method is also provided for controlling a drive train as described above, with the steps:
- applying a power to the primary input shaft of the at least one transmission;
- determining a required rotation speed of the secondary input shaft of the at least one transmission in order to set a required translation ratio between the primary input shaft and the output shaft of the at least one transmission;
- applying the required rotation speed to the secondary input shaft.

Preferably, the power applied to the primary input shaft is determined according to the driving task. Thus the power is increased when the vehicle encounters an increased driving resistance, for example on an uphill gradient. However, this always takes place in interaction with the translation ratio between the primary input shaft and the output shaft.

The power is preferably applied to the primary input shaft via a primary drive as described above. The rotation speed is preferably applied to the secondary input shaft by a secondary drive as described above.

Preferably, the translation ratio between the primary input shaft and the output shaft is set via the rotation speed of the secondary input shaft, at least on each side of the longitudinal direction of the vehicle, preferably wheel-individually. In this way, different translation ratios may be set at the driven wheels of the vehicle. In this way, for example, a differential function or also a differential lock may be implemented.

Preferably, a torque is applied to the secondary input shaft of the at least one transmission solely to set the required rotation speed. The power applied to the secondary input shaft is selected only as high as required to set the desired rotation speed. In particular, thus it is necessary only to overcome the internal resistances of the gear train such as friction. The internal resistances of the gear train may be determined by measurement or in the design of the gear train, and for example taken into account by a control means during performance of the method, in particular by means of a lookup table.

According to the invention, a computer program product with code means is also provided which are configured, when executed on a data processing system, to control a drive train as described above in a method as described above. A data processing system may here be a control means, in particular comprising a control unit on which the code means are stored and can be executed during operation of the drive train.

The invention is not restricted to the embodiments described above. Rather, further embodiments may be achieved by a combination of individual features. It is also conceivable to vary individual features or replace individual features with others with the same effect.

Preferred embodiments of the invention are described below with reference to the appended drawings.

DETAILED DESCRIPTION

Figure 1:
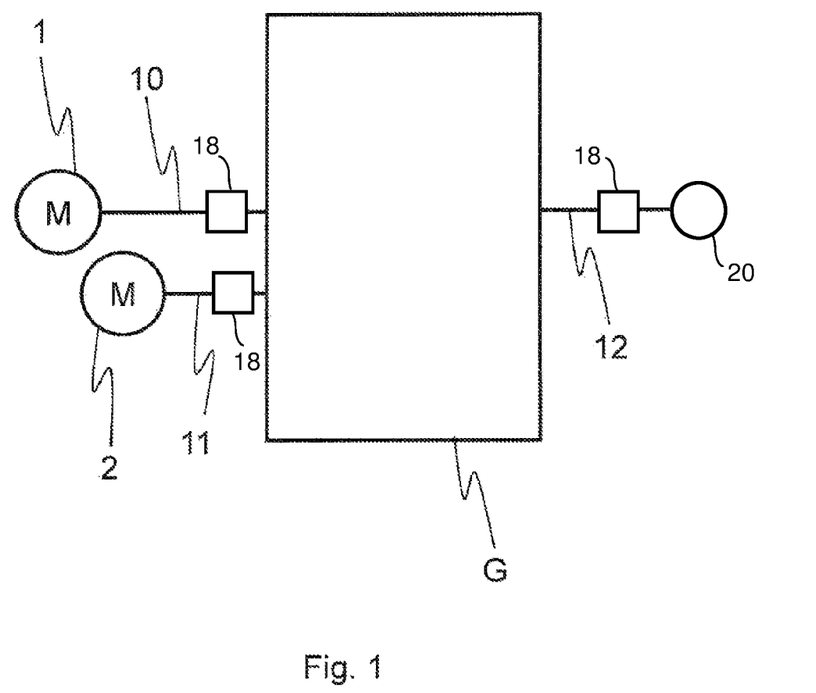
FIG. 1 shows a first embodiment of a drive train according to an embodiment of the invention.

FIG. 1 shows a first embodiment of a drive train according to the invention for a vehicle having a transmission G. The drive train has a primary input shaft 10 which extends to the left out of the transmission G and is connected to a primary drive 1. The drive train also has a secondary input shaft 11 which extends to the left out of the transmission G and is connected to a secondary drive 2. Finally, the drive train has an output shaft 12 which extends to the right out of the transmission G. The output shaft 12 may for example be connected to a differential of the vehicle in which the drive train is provided. Alternatively, the output shaft 12 may be connected directly or via other intermediate elements 18 to a wheel 20 of the vehicle.

The transmission G is configured to adjust a translation ratio between the primary input shaft 10 and the output shaft 12 steplessly on the basis of the rotation speed of the secondary input shaft 11. For this, the drive train G comprises a planetary gear train (not shown).

Figure 2:
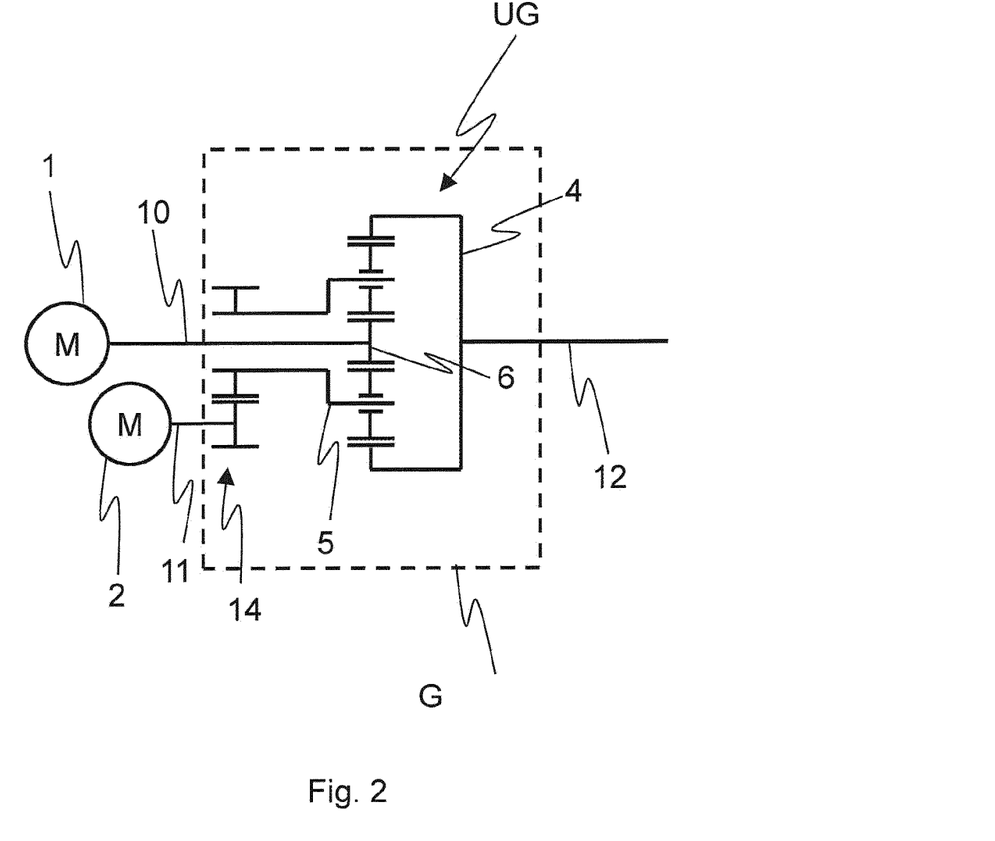
FIG. 2 shows an arrangement in the drive train from FIG. 1.

FIG. 2 shows a particular embodiment of the drive train from FIG. 1. Inside the transmission G, the housing of which is here indicated as the box in dotted lines, is a planetary gear train UG which here comprises a sun gear 6, a carrier shaft 5 carrying the planet gears, and a ring gear 4. The sun gear 6 is here connected to the primary input shaft 10, either directly or via intermediate elements 18, and the ring gear 4 is connected to the output shaft 12 either directly or via intermediate elements 18. The carrier shaft 5 is connected to the secondary input shaft 11 via an intermediate gear unit 14 which here has one gear stage. The carrier shaft 5 finally is configured as a hollow shaft through which the primary input shaft 10 extends.

The secondary drive 2 may finally be configured to hold the carrier shaft 5 stationary so that the planetary gear train UG can be operated with stationary carrier shaft 5.

Otherwise, the further elements and their construction correspond to the illustrations in FIG. 1, so no further description is given.

The function method of the drive train from FIG. 2 is as follows.

The primary drive 1, comprising for example an internal combustion engine and/or an electric motor, feeds a mechanical power via the primary input shaft 10 into the transmission G, in particular onto the sun gear 6 of the planetary gear train UG. This power is transferred via the planetary gear train UG to the output shaft 12 and from there transmitted to at least one wheel of the vehicle.

If now the carrier shaft 5 is at a standstill or is held stationary by the secondary drive 2, in that the latter brakes the secondary input shaft 11 to a standstill, the planetary gear train UG is operated with a set idling translation ratio. In other words, a fixed translation ratio prevails between the primary input shaft 10 and the output shaft 12.

This translation ratio can now be changed by changing the rotation speed of the carrier shaft 5. By application of the Willis equation given in the description introduction, on pre-definition of a rotation speed of the secondary input shaft 11 and because of the rotation speed of the output shaft 12 which is predefined by the speed of the vehicle, the new rotation speed of the primary input shaft 10 is automatically set.

The setting of the rotation speed of the secondary input shaft 11 may apply to both clockwise rotation speed and counterclockwise rotation speed. Also, at the start of adjustment, the secondary input shaft 11 need not necessarily be stationary or held at a standstill. Rather, the stepless adjustment of the translation ratio can take place from any arbitrary rotation speed of the secondary input shaft 11.

Figure 3:
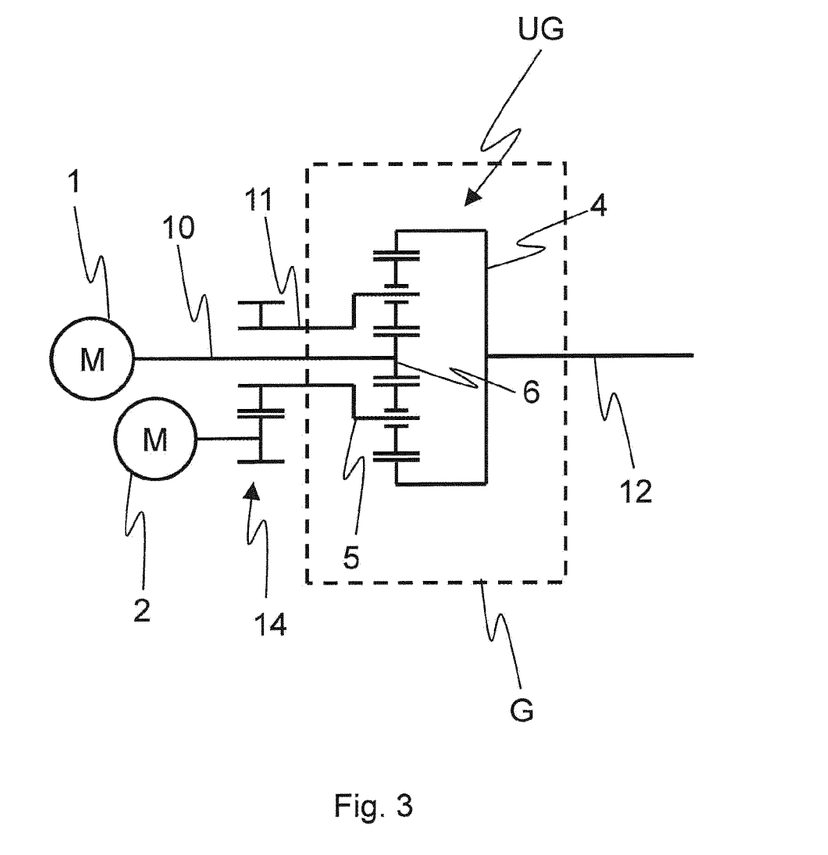
FIG. 3 shows a second embodiment of a drive train according to the invention.

FIG. 3 shows a third embodiment of a drive train according to the invention.

In its structure, this embodiment resembles the embodiment from FIG. 2. However, here the intermediate gear unit 14 is provided outside the housing of the transmission G. Thus the carrier shaft 14 in this embodiment is identical to the primary input shaft 11 of the transmission G.

In this way, a reduced transmission G is formed which comprises only the planetary gear train UG, the primary input shaft 10, the secondary input shaft 11 and the output shaft 12. A path can thus be created which leads from the primary input shaft 10 via the planetary gear train UG to the output shaft 12 and contains no further elements. A further path can be created from the carrier shaft 5 via the planetary gear train UG to the output shaft 12. This further path too contains no further elements.

This configuration may ensure that a relatively compactly structured transmission G is formed.

Figure 4:
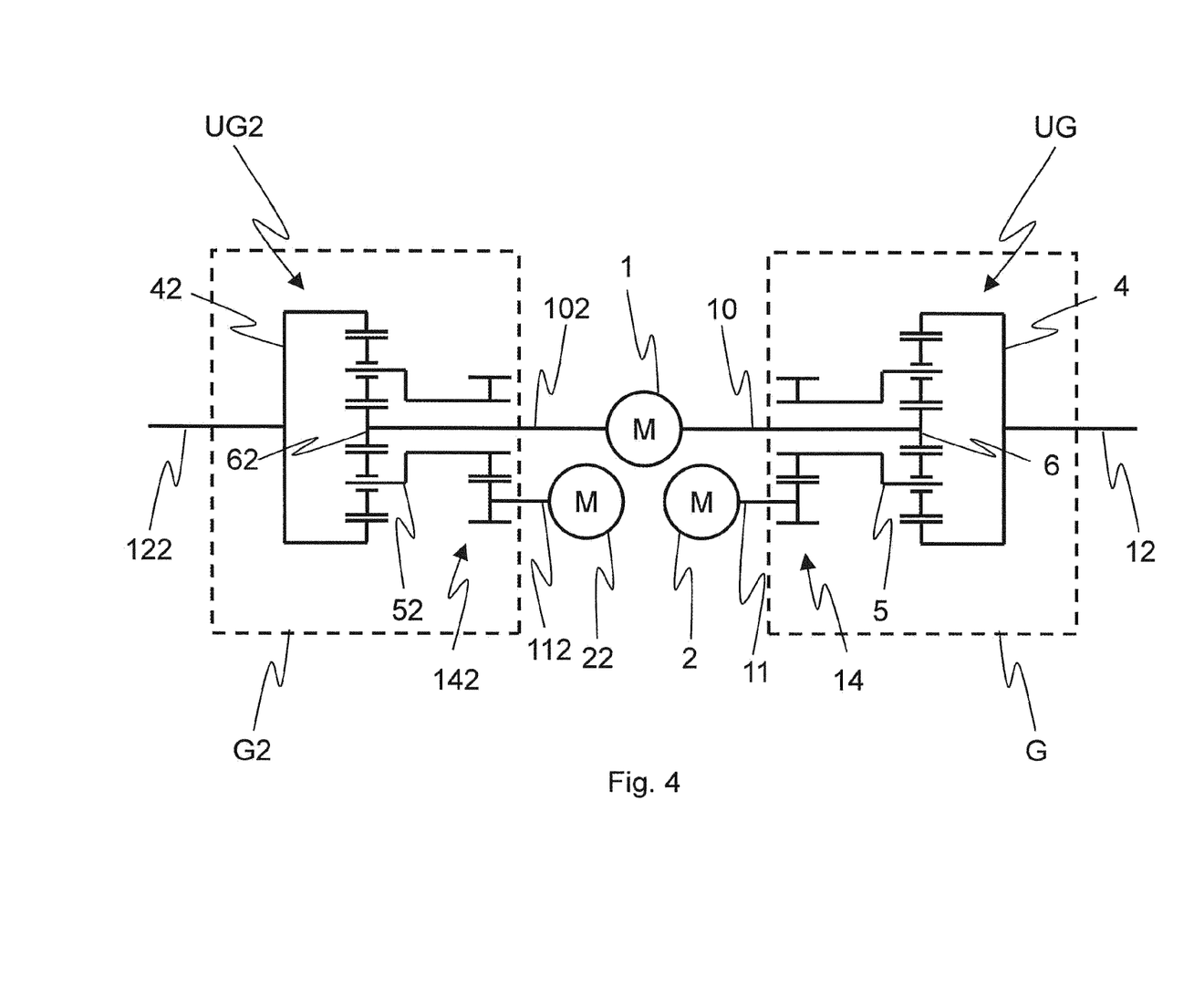
FIG. 4 shows a third embodiment of a drive train according to the invention.

FIG. 4 shows a third embodiment of a drive train according to the invention.

On the right, a configuration corresponding to FIG. 2 is shown. The elements carry the same reference signs, so for explanation of the structure, reference is made to the description relating to FIG. 2. The drive train is supplemented by second drive train which is configured as a mirror image of the first drive train and is shown on the left half of the drawing. All elements present separately in the left drive train carry the same reference signs as in the right drive train, wherein a "2" has been added at the end of the reference sign. Thus the left drive train has a primary input shaft 102 which forms the counterpart to the right primary input shaft 10.

The two primary input shafts 10, 102 are connected to the same primary drive 1. However, the right secondary input shaft 11 is connected to a secondary drive 2, and the left secondary input shaft 112 is connected to a secondary drive 22. In this way, the drive power of the primary drive 1 can be applied to both the left and the right primary input shafts 10, 102, wherein simultaneously the translation ratios between the right primary input shaft 10 and the right output shaft 12 on one side, and between the left primary input shaft 102 and the left output shaft 122 on the other, can be set individually via the two secondary drives 2, 22 or their connected secondary input shafts 11, 112.

The function method of the right and left drive trains corresponds to the function method of the drive train from FIG. 2.

The drive train shown in FIG. 4 may for example function as a drive axle of a vehicle in which the left output shaft 122 is connected to a wheel on the left side of the vehicle, and the right output shaft 12 is connected to a wheel on the right side of the vehicle which sits on the same axle.

The drive train may however also be used to constitute an all-wheel drive or at least multi-axle drive. For this for example, a further configuration, as shown in FIG. 4, may be connected to wheels of a further axle of the vehicle. In order to implement an all-wheel drive, finally all axles of the vehicle may be configured as shown in FIG. 4.

The configuration shown in FIG. 4 may however also be used to conduct the power of the primary drive to different axles of the vehicle. For example, the left output shaft 122 may be connected to a differential on a front axle of the vehicle, so that power reaches the front axle via a steplessly adjustable translation ratio of the planetary gear train UG2. At the same time, the right output shaft 12 may be connected to a differential on a rear axle of the vehicle, so that power reaches the rear axle via a steplessly adjustable translation ratio of the planetary gear train UG.

In all these configurations, it is advantageous that via the secondary drives 2, 22, the translation ratio of the primary input shaft 10, 102 to the respective output shaft 12, 122 can be adjusted steplessly.

The invention is not restricted to the embodiments listed here. Rather, further embodiments are possible by the addition, omission or exchange of individual features. In particular, in the configuration from FIG. 4, it may also be provided that the primary drive 1 is connected only to the right primary input shaft 10, wherein a further primary drive is provided which is connected to the left primary input shaft 102. In this way, not only is an independent setting of the translation ratio of the respective primary input shaft 10, 102 to the respective output shaft 12, 122 possible, rather now also an individual power conduction to the primary input shafts 10, 102.

Configurations which are functionally equivalent to the configurations in FIG. 4 may also be formed if the drive trains from FIG. 1 and/or FIG. 3 are combined accordingly.

Finally, in all embodiments of FIGS. 1 to 4, devices may be provided for interrupting the torque transmission at the primary input shaft 10, 102, the secondary input shaft 11, 112, and/or the output shaft 12, 122. These are in particular clutches such as friction or plate clutches, but also form-fit clutches such as claw clutches. The clutches may be designed to be switchable in order to be able to decouple a drive 1, 2 or also the output shaft 12 in targeted fashion.

In all embodiments of FIGS. 1 to 4, devices may also be provided for converting torque or rotation speed at the primary input shaft 10, 102, the secondary input shaft 11, 112, and/or the output shaft 12, 122. These are preferably torque converters and/or gear stages. These devices may in particular be configured so as to be switchable. Gear units may, as well as the configuration as a single-stage gear unit, preferably also be configured as selectable gear mechanisms with several stages.

LIST OF REFERENCE SIGNS

1 Primary drive
2 Secondary drive
4 Ring gear
5 Carrier

6 Sun gear
10 Primary input shaft
11 Secondary input shaft
12 Output shaft
14 Intermediate gear unit
22 Secondary drive
42 Ring gear
52 Carrier
62 Sun gear
102 Primary input shaft
112 Secondary input shaft
122 Output shaft
142 Intermediate gear unit
G Transmission
G2 Second transmission
UG Planetary gear train
UG2 Planetary gear train

The invention claimed is:

1. A drive train for a vehicle, comprising:
at least one transmission, the at least one transmission including
a primary input shaft configured to connected to a primary drive,
a secondary input shaft configured to be connected to a secondary drive,
an output shaft configured to output power introduced into the at least one transmission by the primary input shaft,
a planetary gear train configured to steplessly adjust a translation ratio between the primary input shaft and the output shaft in response to changes in a rotation speed of the secondary input shaft, and
an at least selectively-actuatable connection configured to interrupt a connection between the planetary gear train and the primary input shaft of the at least one transmission, and
an at least selectively-actuatable connection configured to interrupt a connection between the planetary gear train and the secondary input shaft of the at least one transmission, wherein
the primary input shaft is connected directly or via intermediate elements to a sun gear of the planetary gear train to feed a mechanical power via the primary input shaft onto the sun gear of the planetary gear train to be transferred via the planetary gear train to the output shaft,
the secondary input shaft is connected directly or via intermediate elements to a carrier shaft of the planetary gear train to hold the carrier shaft at a standstill or stationary, or to change the rotation speed of the carrier shaft via the secondary drive, and
the output shaft is connected directly or via intermediate elements to a ring gear of the planetary gear train.

2. The drive train as claimed in claim 1, wherein the primary input shaft, the secondary input shaft and/or the output shaft are directly connected to a shaft of the planetary gear train.

3. The drive train as claimed in claim 1, further comprising:
an intermediate gear unit arranged between the primary input shaft, the secondary input shaft and/or the output shaft and the planetary gear train.

4. The drive train as claimed in claim 1, wherein
the at least one transmission has a path which leads from the primary input shaft exclusively via the planetary gear train to the output shaft, and/or
the at least one transmission has a further path which leads from the secondary input shaft exclusively via the planetary gear train to the output shaft.

5. The drive train as claimed in claim 1, wherein
the at least one transmission includes more than one transmission, each of the at least one secondary drive is configured to be connected to a respective one of the secondary input shafts of the more than one transmission.

6. The drive train as claimed in claim 1, wherein
the output shaft of the at least one transmission is configured to be connected directly or via intermediate elements to at least one wheel of the vehicle.

7. The drive train as claimed in claim 6, wherein
the intermediate elements include a differential.

8. The drive train as claimed in claim 6, wherein
the at least one transmission includes a first transmission and a second transmission,
the output shaft of the first transmission is connected to one or more wheels of a first axle on one side of a longitudinal direction of the vehicle, and
an output shaft of the second transmission is connected to one or more wheels of a second axle on the other side of a longitudinal direction of the vehicle.

9. The drive train as claimed in claim 8, wherein
the drive train is configured to set the translation ratio between the primary input shaft and the output shaft of each of the first and second transmissions by setting the rotation speeds of the respective secondary input shafts.

10. A computer program product with non-transitory code, the non-transitory code, when executed on a computer, being configured to control the drive train as claimed in claim 1.

11. The drive train as claimed in claim 5, wherein
the primary drive includes an internal combustion engine and/or an electric motor, and the secondary drive includes an electric motor.

12. A vehicle having a drive train, comprising:
at least one transmission, the at least one transmission including
a primary input shaft configured to connected to a primary drive,
a secondary input shaft configured to be connected to a secondary drive,
an output shaft configured to output power introduced into the at least one transmission by the primary input shaft,
a planetary gear train configured to steplessly adjust a translation ratio between the primary input shaft and the output shaft in response to changes in a rotation speed of the secondary input shaft,
an at least selectively-actuatable connection configured to interrupt a connection between the planetary gear train and the primary input shaft of the at least one transmission, and
an at least selectively-actuatable connection configured to interrupt a connection between-the planetary gear train and the secondary input shaft of the at least one transmission, wherein
the output shaft of the at least one transmission is connected to at least one wheel of the vehicle directly or via intermediate elements,
the primary input shaft is connected directly or via intermediate elements to a sun gear of the planetary gear train to feed a mechanical power via the primary input shaft onto the sun gear of the planetary gear train to be transferred via the planetary gear train to the output shaft, the secondary input shaft is connected directly or via intermediate elements to a carrier shaft of the planetary gear train to hold the carrier shaft at a standstill or stationary, or to change the rotation speed of the carrier shaft via the secondary drive, and the output shaft is connected directly or via intermediate elements to a ring gear of the planetary gear train.

13. The vehicle of claim 12, wherein
the intermediate elements include a differential.

14. A method for controlling a drive train having at least one transmission, the at least one transmission including
a primary input shaft configured to connected to a primary drive,
a secondary input shaft configured to be connected to a secondary drive,
an output shaft configured to output power introduced into the at least one transmission by the primary input shaft,
a planetary gear train configured to steplessly adjust a translation ratio between the primary input shaft and the output shaft in response to changes in a rotation speed of the secondary input shaft,
an at least selectively-actuatable connection configured to interrupt a connection between the planetary gear train and the primary input shaft of the at least one transmission, and
an at least selectively-actuatable connection configured to interrupt a connection between-the planetary gear train and the secondary input shaft of the at least one transmission, comprising the acts of:
applying power to the primary input shaft of the at least one transmission;
determining a required rotation speed of the secondary input shaft of the at least one transmission to set a predetermined translation ratio between the primary input shaft and the output shaft of the at least one transmission;

rotating the secondary input shaft at the required rotation speed, wherein the primary input shaft is connected directly or via intermediate elements to a sun gear of the planetary gear train to feed a mechanical power via the primary input shaft onto the sun gear of the planetary gear train to be transferred via the planetary gear train to the output shaft, the secondary input shaft is connected directly or via intermediate elements to a carrier shaft of the planetary gear train to hold the carrier shaft at a standstill or stationary, or to change the rotation speed of the carrier shaft via the secondary drive, and the output shaft is connected directly or via intermediate elements to a ring gear of the planetary gear train.

15. The method as claimed in claim 14, wherein
the at least one transmission includes a first transmission and a second transmission,
the output shaft of the first transmission is connected to one or more wheels of a first axle on one side of a longitudinal direction of the vehicle,
an output shaft of the second transmission is connected to one or more wheels of a second axle on the other side of a longitudinal direction of the vehicle, and
the translation ratio between the primary input shaft and the output shaft of each of the first and second transmissions is set via the rotation speed of the respective secondary input shafts at least on each side of the longitudinal direction of the vehicle.

16. The method as claimed in claim 14, wherein
a torque is applied to the secondary input shaft of the at least one transmission in an amount to set the required rotation speed without increasing a torque applied to the output shaft.

17. A computer program product with non-transitory code, the non-transitory code, when executed on a computer, being configured to control the drive train during the method as claimed in claim 14.

* * * * *